(12) United States Patent
Kyuma

(10) Patent No.: US 6,348,948 B1
(45) Date of Patent: *Feb. 19, 2002

(54) INTERCHANGEABLE LENS TYPE CAMERA SYSTEM

(75) Inventor: Kenji Kyuma, Soka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,699

(22) Filed: Sep. 23, 1996

(30) Foreign Application Priority Data

Sep. 29, 1995 (JP) ............................................. 7-253544

(51) Int. Cl.$^7$ ............................................. H04N 5/225

(52) U.S. Cl. ..................... 348/360; 348/358; 348/240

(58) Field of Search .................................. 348/340, 335, 348/240, 358, 207, 344, 360, 361, 369; 396/529; H04N 5/225

(56) References Cited

U.S. PATENT DOCUMENTS

| 4,843,475 | A | * | 6/1989 | Iamai | 358/225 |
|---|---|---|---|---|---|
| 5,161,026 | A | * | 11/1992 | Mabuchi et al. | 348/335 |
| 5,402,174 | A | * | 3/1995 | Takahashi | 396/529 |
| 5,420,632 | A | * | 5/1995 | Yamagiwa | 348/358 |
| 5,485,208 | A | * | 1/1996 | Mabuchi et al. | 348/335 |
| 5,608,457 | A | * | 3/1997 | Tohyama et al. | 348/335 |
| 5,973,857 | A | * | 10/1999 | Kaneda | 359/701 |

FOREIGN PATENT DOCUMENTS

JP 2206103 * 3/1992 .......... H04N/5/232

* cited by examiner

*Primary Examiner*—Tuan Ho
(74) *Attorney, Agent, or Firm*—Robin, Blecker & Daley

(57) ABSTRACT

In an interchangeable lens type camera system composed of an interchangeable lens unit and a camera body and having an optical zooming process and an electronic zooming process, information about inhibition or permission of the electronic zooming process is transmitted from the lens unit to the camera body, and information about the stoppage or moving direction of a zoom lens is transmitted from the camera body to the lens unit, so that a switching between the optical zooming process and the electronic zooming process is smoothly carried out.

19 Claims, 10 Drawing Sheets

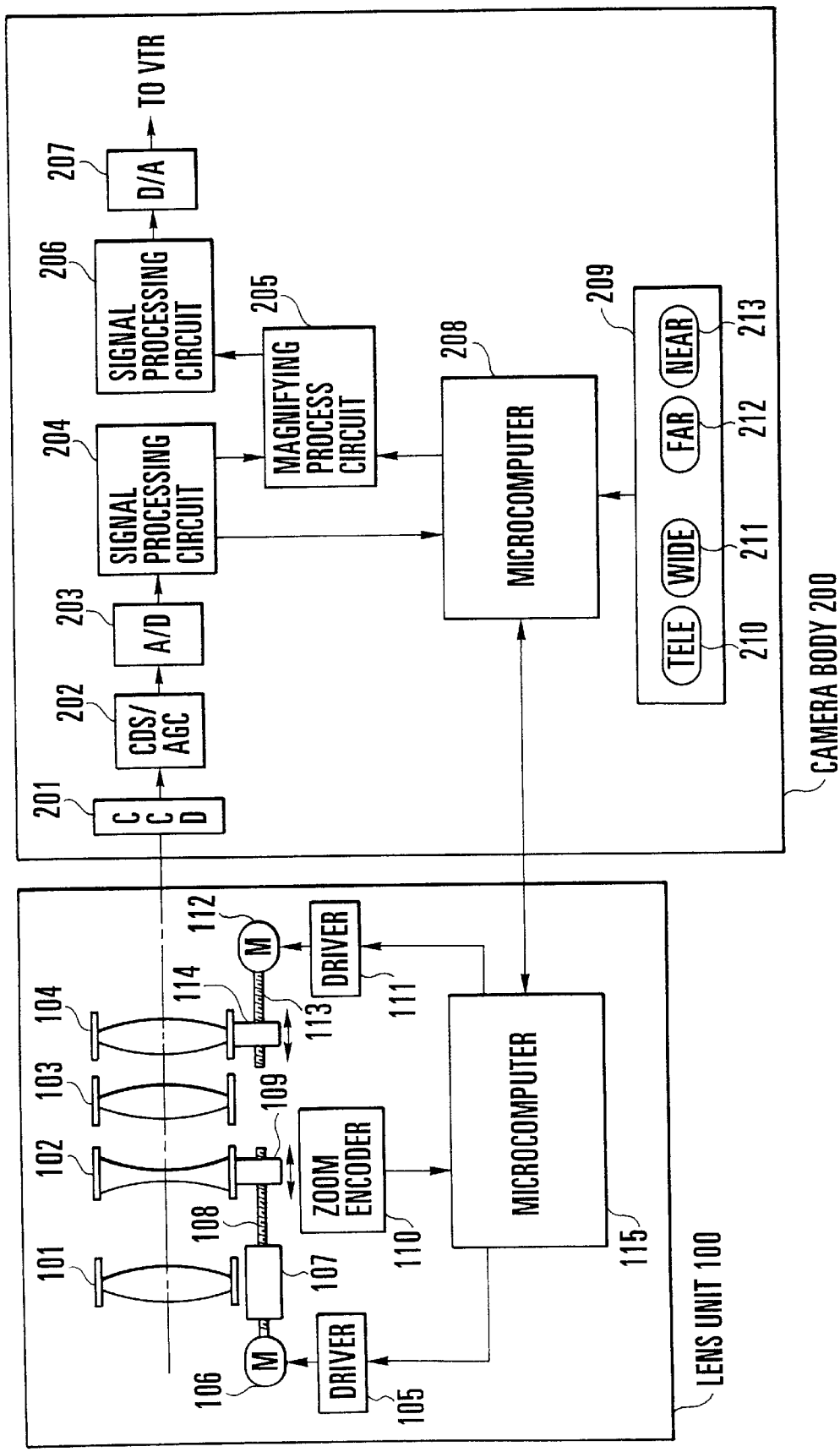

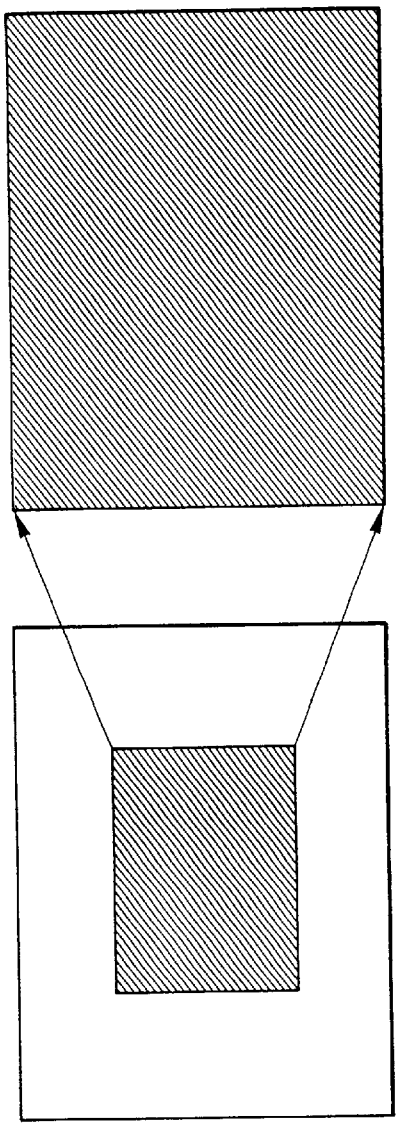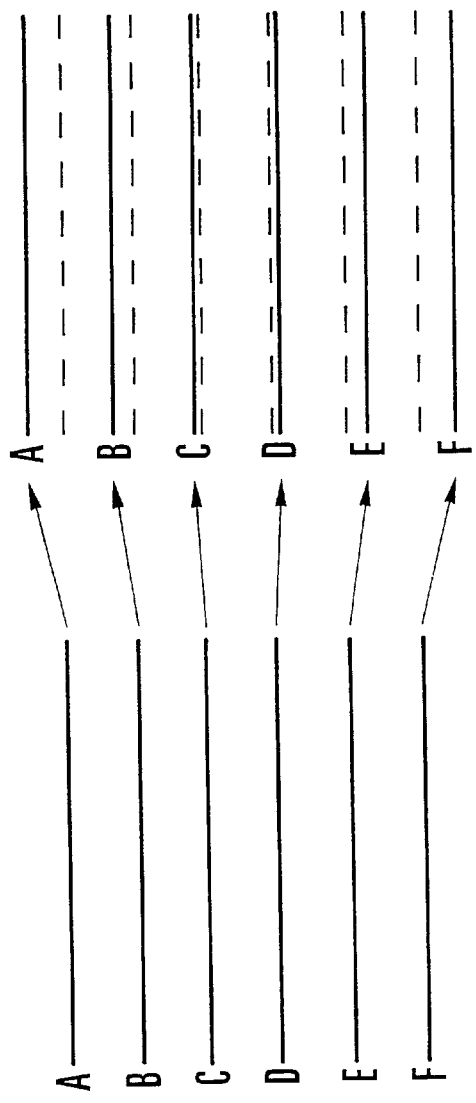

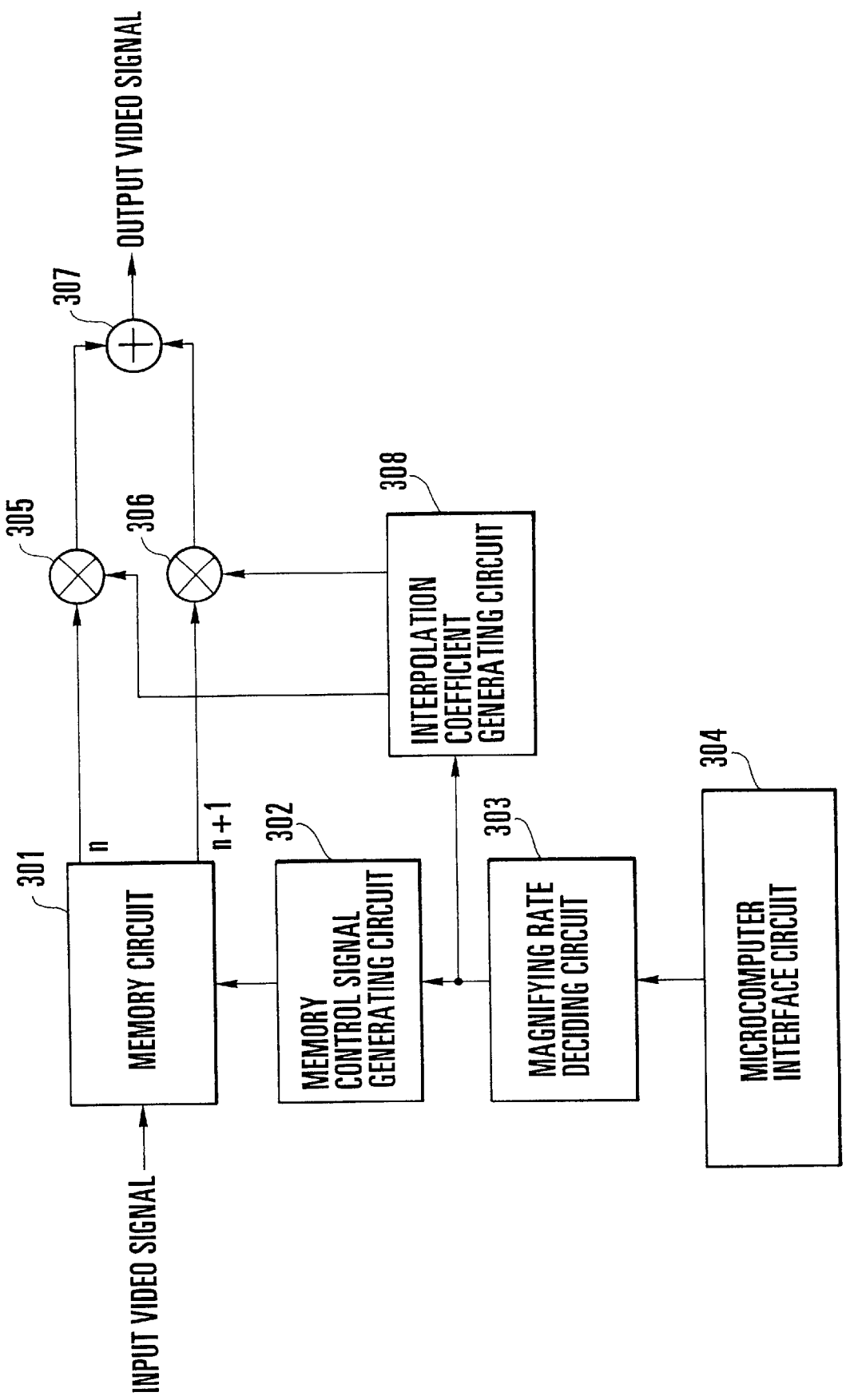

INTERCHANGEABLE LENS TYPE CAMERA SYSTEM

BACKGROUND OF THE INVENTION

1. Field of the Invention

This invention relates to an interchangeable lens type camera system which is provided with both an optical zoom means and an electronic zoom means.

2. Description of Related Art

The advancement of image pickup apparatuses such as video cameras, etc., has been conspicuous during recent years. The functions of these apparatuses are thus being diversified and their operability is being improved.

As a result of the functional diversification, there have been made many improvements on the video cameras, for example, an interchangeable lens type camera system has been introduced into the field of the video cameras, thereby making them usable for all shooting conditions. Further, an electronic zoom means for electronically magnifying an image also has been introduced into the video cameras, so that an image which has been magnified by an optical zoom means is further magnified by an electronic process. Therefore, such high magnifying rates that are not attainable with an optical zoom lens alone have become attainable.

Meanwhile, video cameras provided with both an optical zoom means and an electronic zoom means and arranged to perform a zooming action by a combination of the two zoom means have been disclosed in U.S. Pat. No. 4,843,475, U.S. patent application Ser. No. 08/078,565 filed Jun. 17, 1993, etc. Each of these video cameras has a lens unit undetachably fixed to a camera body and is thus arranged to permit control to be always univocally performed on the optical zoom means and the electronic zoom means. However, these video cameras are, unlike the interchangeable lens type camera system, arranged without taking into consideration the necessity of matching control over the lens unit with control over the camera body.

More specifically, in the case of an interchangeable lens type camera system, since a lens unit is detachably mounted on a camera body, where a zoom lens (optical zoom means) is disposed on the side of the lens unit and an electronic zoom means is disposed on the side of the camera body, a zoom operation part may be variously arranged such that it is provided on the side of the camera body or on the side of the lens unit or both on the side of the camera body and the side of the lens unit. Therefore, it has been hardly possible to always appositely carry out control between the lens unit and the camera body.

For example, it is difficult to set timing for switching between an optical zooming process performed in the interchangeable lens unit and an image magnifying process (electronic zooming process) performed in the camera body. Further, in a case where the interchangeable lens unit has a zoom ring for mechanically moving the position of a variator lens and a slip mechanism is provided at a gear for transmitting the motion of the zoom ring, for example, there has been provided no means for cancelling the image magnifying process (electronic zooming process) on the side of the camera body when the operator operates the zoom ring toward a wide-angle side.

Further, although a good picture quality can be kept during the optical zooming process, the largest possible rate of magnification by means of a lens is naturally limited with respect to the performance of the lens, the size and weight of the system, etc. The electronic zoom means is able to make up for the insufficiency of the magnification possible by the optical zoom means. However, the electronic zooming process causes some deterioration in picture quality. Therefore, it has been extremely difficult for the interchangeable lens type camera system to optimize control over both the optical zoom means and the electronic zoom means in such a way as to obtain images in their best quality. The solution of this problem has been strongly desired.

BRIEF SUMMARY OF THE INVENTION

This invention is directed to the solution of the above-stated problem. It is, therefore, a first object of this invention to provide an image pickup apparatus which is arranged to permit smooth switching between an optical zooming process and an electronic zooming process.

It is a second object of this invention to provide an interchangeable lens type camera system arranged to permit smooth switching between an optical zooming process and an electronic zooming process and to provide an adequate control over each of the two zooming processes.

To attain these objects, in accordance with a preferred embodiment of this invention, there is provided an interchangeable lens type camera system which is composed of a camera body and a lens unit detachably mounted on the camera body, comprising optical magnification varying means disposed within the lens unit, electronic magnification varying means disposed within the camera body and arranged to electronically magnify an image, lens-side control means disposed on the side of the lens unit and arranged to transmit to the camera body information used for controlling inhibition or permission of an action of the electronic magnification varying means on the basis of an operating state of the optical magnification varying means, and camera-side control means disposed on the side of the camera body and arranged to control the electronic magnification varying means on the basis of the information received from the lens-side control means.

To attain the above-stated objects, in accordance with the preferred embodiment of this invention, there is provided a lens unit adapted to be detachably mounted on a camera body having electronic magnification varying means for electronically magnifying an image, comprising optical magnification varying means, and control means arranged to transmit to the camera body information used for controlling inhibition or permission of an action of the electronic magnification varying means according to an operating state of the optical magnification varying means.

To attain the above-stated objects, in accordance with the preferred embodiment of this invention, there is provided an interchangeable lens type camera adapted to detachably mount a lens unit thereon, comprising means for receiving, from the lens unit, information about an operating state of optical magnification varying means disposed within the lens unit, image pickup means for photo-electrically converting an optical image formed through the lens unit into a picked-up image signal and for outputting the picked-up image signal, electronic magnification varying means for electronically magnifying the picked-up image signal, and control means for controlling inhibition or permission of an action of the electronic magnification varying means on the basis of the information about the operating state of the optical magnification varying means.

The above and other objects and features of this invention will become apparent from the following detailed description of embodiments thereof taken in connection with the accompanying drawings.

BRIEF DESCRIPTION OF THE SEVERAL VIEWS OF THE DRAWING

FIG. 1 is a block diagram showing the arrangement of an interchangeable lens type video camera system.

FIGS. 2(a) to 2(d) are diagrams for explaining an electronic zooming process.

FIG. 3 is a block diagram showing the arrangement of a magnifying process circuit for performing the electronic zooming process.

DETAILED DESCRIPTION OF THE INVENTION

Figure 4:
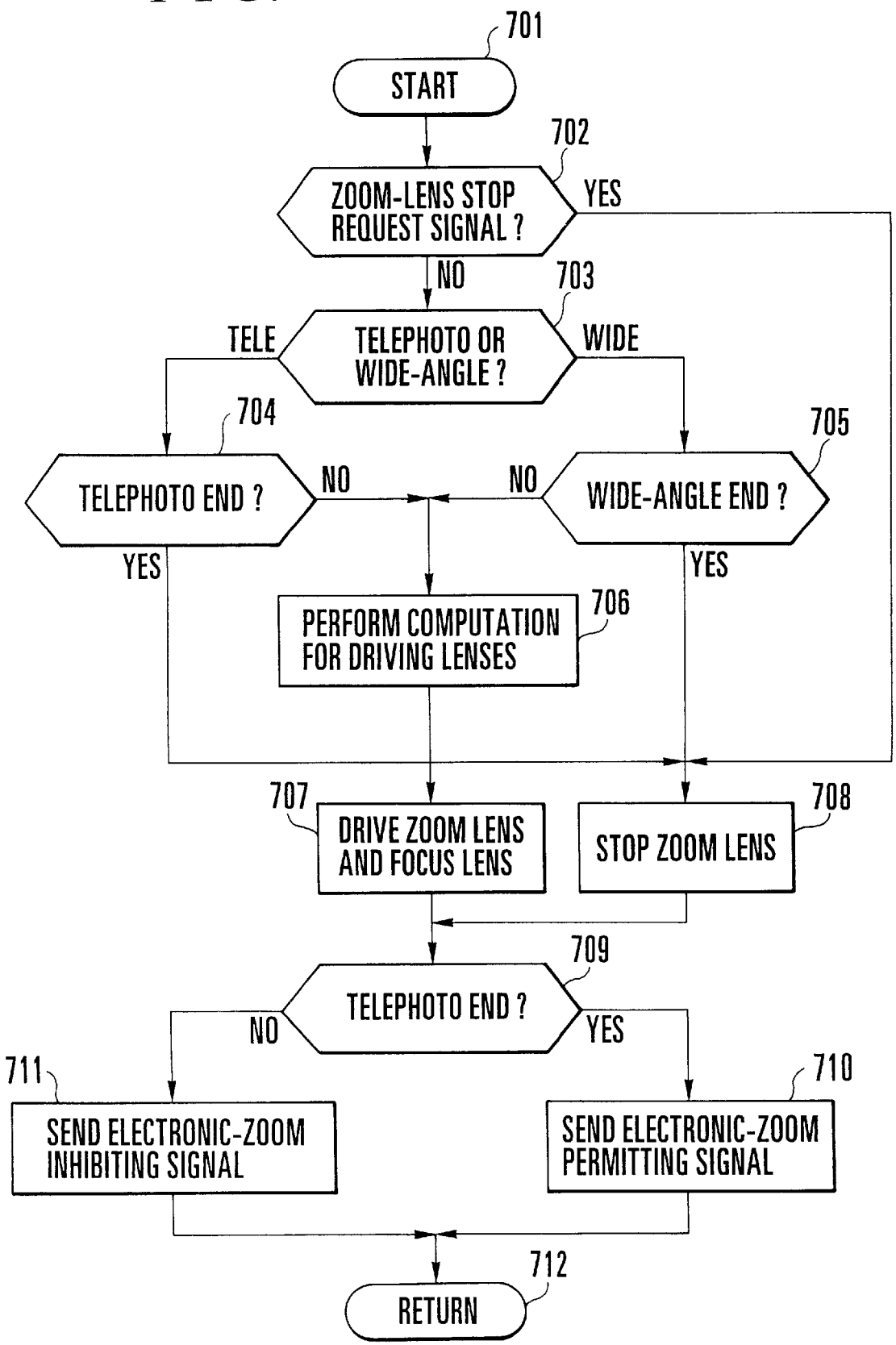
FIG. 4 is a flow chart showing processes related to a zooming operation of a lens microcomputer according to a first embodiment of this invention.

Preferred embodiments of this invention are described below with reference to the drawings.

FIG. 1 is a block diagram showing the arrangement of an interchangeable lens type video camera system.

Referring to FIG. 1, the interchangeable lens type camera system is composed of a lens unit 100 and a camera body 200 on which the lens unit 100 is detachably mounted.

The lens unit 100 includes a fixed front lens group 101, a variator lens group (zoom lens) 102 arranged to vary magnification, a fixed lens group 103, and a compensator lens group (focus lens) 104 arranged to carry out both a compensating function and a focusing function. An inner focus type lens system is formed by the lens groups 101 to 104.

The lens unit 100 further includes a stepping motor 106 arranged to move the variator lens group 102, a rotation shaft 108 having a screw and connected to the stepping motor 106 through a gear 107, a rack 109 movably provided on the rotation shaft 108 and having the variator lens group 102 mounted thereon, a driver 105 arranged to drive the stepping motor 106, and a zoom encoder 110 arranged to detect the position of the variator lens group 102.

The lens unit 100 further includes a stepping motor 112 arranged to move the compensator lens group 104, a rotation shaft 113 having a screw and connected directly to the stepping motor 112, a rack 114 movably mounted on the rotation shaft 113 and having the compensator lens group 104 mounted thereon, a driver 111 arranged to drive the stepping motor 112, and a microcomputer 115 arranged to perform control on the side of the lens unit 100 (hereinafter referred to as lens microcomputer). The lens microcomputer 115 is arranged to communicate control information of varied kinds and data with a microcomputer 208 which is disposed on the side of the camera body, and is thus arranged to control the drivers 105 and 111 and to obtain position detecting information from the zoom encoder 110.

The camera body 200 includes an image sensor 201 such as a CCD or the like, a CDS/AGC circuit 202 arranged to perform correlated double sampling and automatic gain control, an A/D converter 203, a signal processing circuit 204, a magnifying process circuit 205 arranged to perform an electronic zooming process by electronically magnifying a video signal outputted from the signal processing circuit 204, a signal processing circuit 206, a D/A converter 207, the microcomputer 208 (hereinafter referred to as camera microcomputer) arranged to communicate with the lens microcomputer 115 as well as to control the whole camera system, zoom switches 210 and 211 arranged to move the zoom lens and the electronic zoom means toward the telephoto end and the wide-angle end, respectively, focus switches 212 and 213 arranged to move the focus lens toward the infinity position and the nearest distance position, respectively, and a switch group 209 including the switches 210, 211, 212 and 213.

The operation of the interchangeable lens type video camera system is next described as follows.

When the lens unit 100 is mounted on the camera body 200, electric power is supplied from the camera body 200 to the lens unit 100. Light from an object to be picked up comes through the lens groups 101 to 104 to be imaged on the image sensor (CCD) 201. The image sensor 201 photo-electrically converts the image thus formed into a video signal. The video signal is processed by the CDS/AGC circuit 202. The signal thus processed is converted into a digital video signal by the A/D converter 203. The digital video signal is sent to the signal processing circuit 204 to be subjected to various processes such as a gamma correction process, etc. The digital video signal thus processed is sent to the magnifying process circuit 205 to be subjected to an image magnifying process which will be described later herein. After the image magnifying process, the digital video signal is sent to the signal processing circuit 206 to be subjected to processes including a balanced modulation process for chrominance signals. The output of the signal processing circuit 206 is converted into an analog video signal by the D/A converter 205. The analog video signal is sent to a VTR or the like which is not shown.

The operation of the lens microcomputer 115 and the zooming and focusing actions of the lens unit 100 are performed as follows.

Upon receipt of an instruction for zooming and focusing, the lens microcomputer 115 performs programmed processes to decide the rotating speeds and directions of the stepping motors 106 and 112 and outputs control signals for the rotating speeds and directions. The stepping motors 106 and 112 are controlled by the control signals through the drivers 105 and 110. More specifically, for zooming, the rotating direction of the stepping motor 106 is decided according to information on the states of the switches 210 and 211 sent from the camera microcomputer 208. For focusing, the rotating direction of the stepping motor 112 is decided according to information on the states of the switches 212 and 213 in the case of a manual operation, or according to AF routine procedures stored within the lens microcomputer 115 in the case of AF (automatic focusing).

The motors 106 and 112 are controlled to rotate in accordance with the control signals, so that the rotation shaft 108 is caused to rotate through the gear 107 while the rotation shaft 113 is directly caused to rotate. Then, the racks 109 and 114 are moved backward or forward together with the lens groups 102 and 104, respectively. Accordingly, a desired zooming state and a desired focusing state can be obtained.

The image magnifying (electronic zooming) process of the magnifying process circuit 205 by using linear interpolation is next described with reference to FIGS. 2(a) to 2(d) as follows.

The image magnifying process is executed when the operator of the video camera system operates the zoom switch 210 or 211. In a case where an original video image shown in FIG. 2(a) is to be magnified into an enlarged video image as shown in FIG. 2(b), a relation in scanning lines between the video images of FIGS. 2(a) and 2(b) becomes as shown in FIGS. 2(c) and 2(d). In this case, scanning lines as indicated by broken lines in FIG. 2(d) are newly formed on the basis of the scanning lines A to F on the original video image shown in FIG. 2(c). For that purpose, a scanning line indicated by a broken line in FIG. 2(d) is obtained by multiplying two scanning lines indicated by full lines in FIG. 2(c) by weights (interpolation coefficients) corresponding to required distances and adding together the weight-multiplied scanning lines. The original video image can be magnified at a desired magnifying rate by carrying out such a linear interpolating process both in the vertical and horizontal directions of the video image.

FIG. 3 shows by way of example the arrangement of the magnifying process circuit 205. Referring to FIG. 3, an input video signal is caused to be stored in a memory circuit 301 by a memory control signal generating circuit 302. A microcomputer interface circuit 304 is arranged to receive from the camera microcomputer 208 information on a magnifying rate. In accordance with the information, a magnifying rate deciding circuit 303 informs the memory control signal generating circuit 302 and an interpolation coefficient generating circuit 308 of the magnifying rate. The memory control signal generating circuit 302 reads out from the memory circuit 301 a signal of the n-th line and a signal of the (n–1)st line which has been delayed from the signal of the n-th line as much as one H (one horizontal scanning period). Meanwhile, the interpolation coefficient generating circuit 308 generates interpolation coefficients corresponding to the magnifying rate and supplies them to multipliers 305 and 306. The multipliers 305 and 306 multiply the signal of the n-th line and the signal of the (n–1)st line by the interpolation coefficients, respectively. The multiplication outputs thus obtained at the multipliers 305 and 306 are added together by an adder 307. The result of addition is outputted from the adder 307 as an output video signal.

In the interchangeable lens type video camera system configured as shown in FIG. 1 according to the first embodiment of this invention, the lens microcomputer 115 and the camera microcomputer 208 execute the respective processes and conduct communication with each other as follows.

The processes to be executed by the camera microcomputer 208 are first described with reference to FIG. 6 which is a flow chart.

Figure 6:
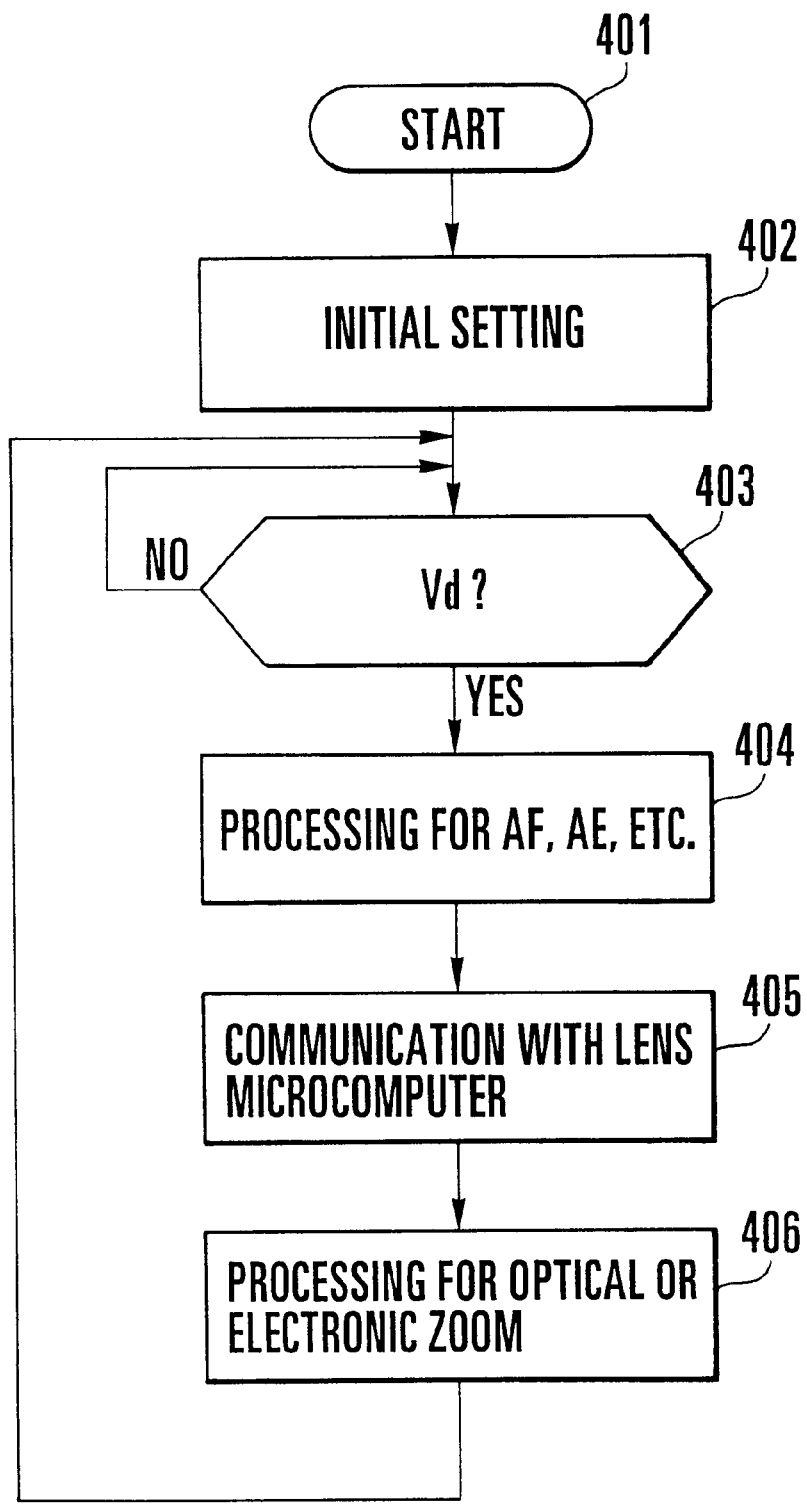
FIG. 6 is a flow chart showing processes of the camera microcomputer.

Referring to the flow chart of FIG. 6, a flow of processes begins at a step 401. At a step 402, an initial setting process is carried out in a predetermined manner. At a step 403, the flow waits for arrival of a vertical synchronizing signal Vd. When the vertical synchronizing signal Vd is inputted, the flow comes to a step 404. At the step 404, the processes of AF (automatic focusing), AE (automatic exposure), etc., are carried out. At a step 405, the camera microcomputer 208 conducts communication with the lens microcomputer 115 in a predetermined manner. At a next step 406, an electronic zooming process or an optical zooming process are carried out according to the states of the zoom switches 210 and 211. The flow then comes back to the step 403.

Figure 7:
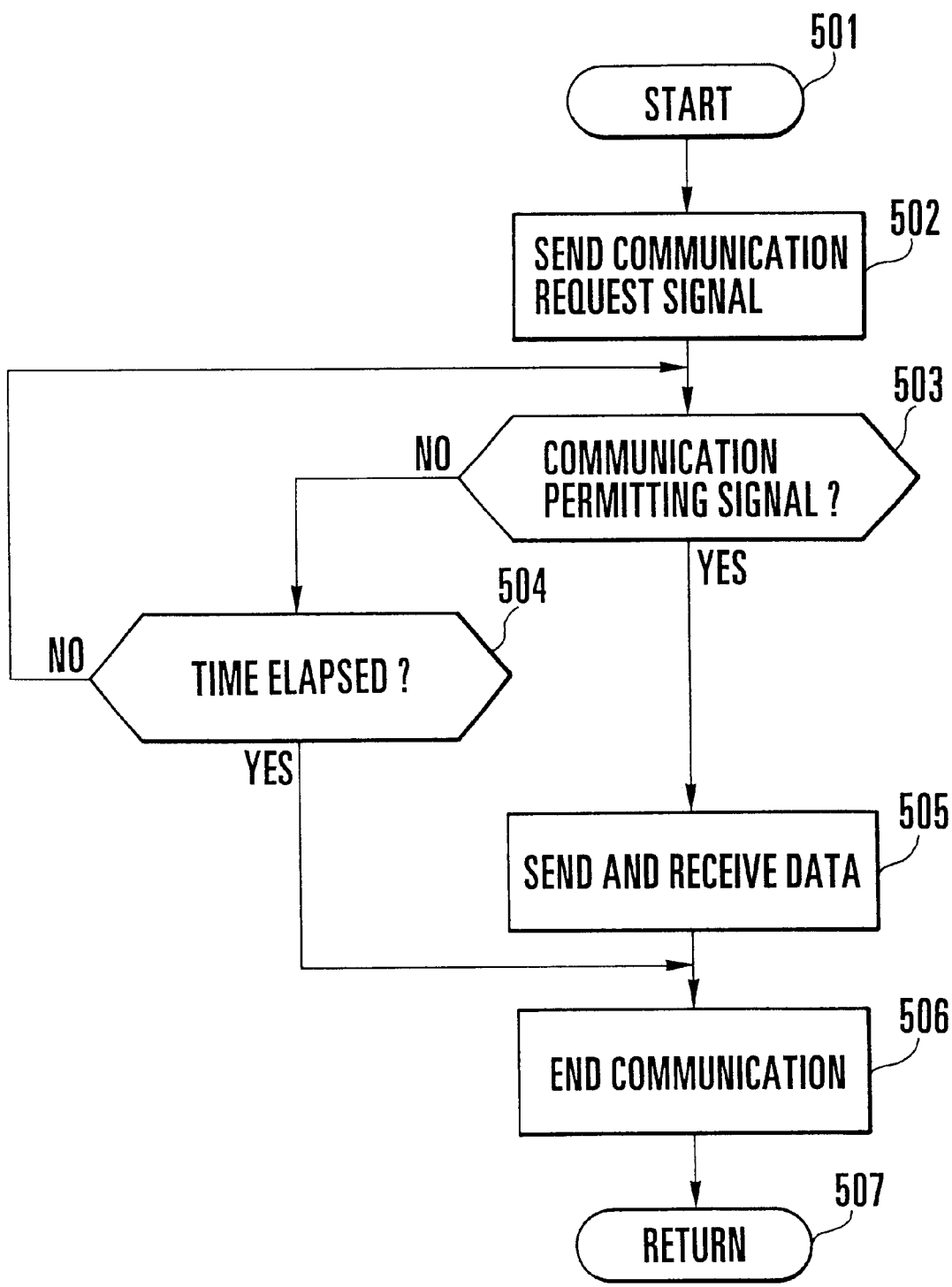
FIG. 7 is a flow chart showing processes of the camera microcomputer.

FIG. 7 is a flow chart showing the details of the above-stated step 405 of FIG. 6 relative to the communication to be conducted by the camera microcomputer 208 with the lens microcomputer 115.

Referring to FIG. 7, the flow of processes begins at a step 501. At a step 502, a communication request signal is sent from the camera microcomputer 208 to the lens microcomputer 115. At a step 503, a check is made to find if a communication permitting signal is received from the lens microcomputer 115. If so, the flow comes to a step 505. If not, the flow comes to a step 504 to wait for the communication permitting signal for a predetermined period of time. At the step 504, if the predetermined period of time has elapsed without receiving the communication permitting signal, the camera microcomputer 208 gives up the communication, and the flow comes to a step 506 to terminate the communication.

When the communication permitting signal is received within the predetermined period of time, data are bidirectionally communicated between the lens microcomputer 115 and the camera microcomputer 208 at the step 505. The data sent from the camera microcomputer 208 to the lens microcomputer 115 includes information on the stoppage or moving direction of the zoom lens (variator lens group 102) obtained as a result of the process of the above-stated step 406 during the last round of the flow of FIG. 7. The data sent from the lens microcomputer 115 to the camera microcomputer 208 includes information on inhibition or permission for the electronic zooming process according to the operating state of the variator lens group 102 disposed on the side of the lens unit 100. The communication comes to an end at the step 506. At a step 507, the flow proceeds to the step 406 of FIG. 6.

Figure 5:
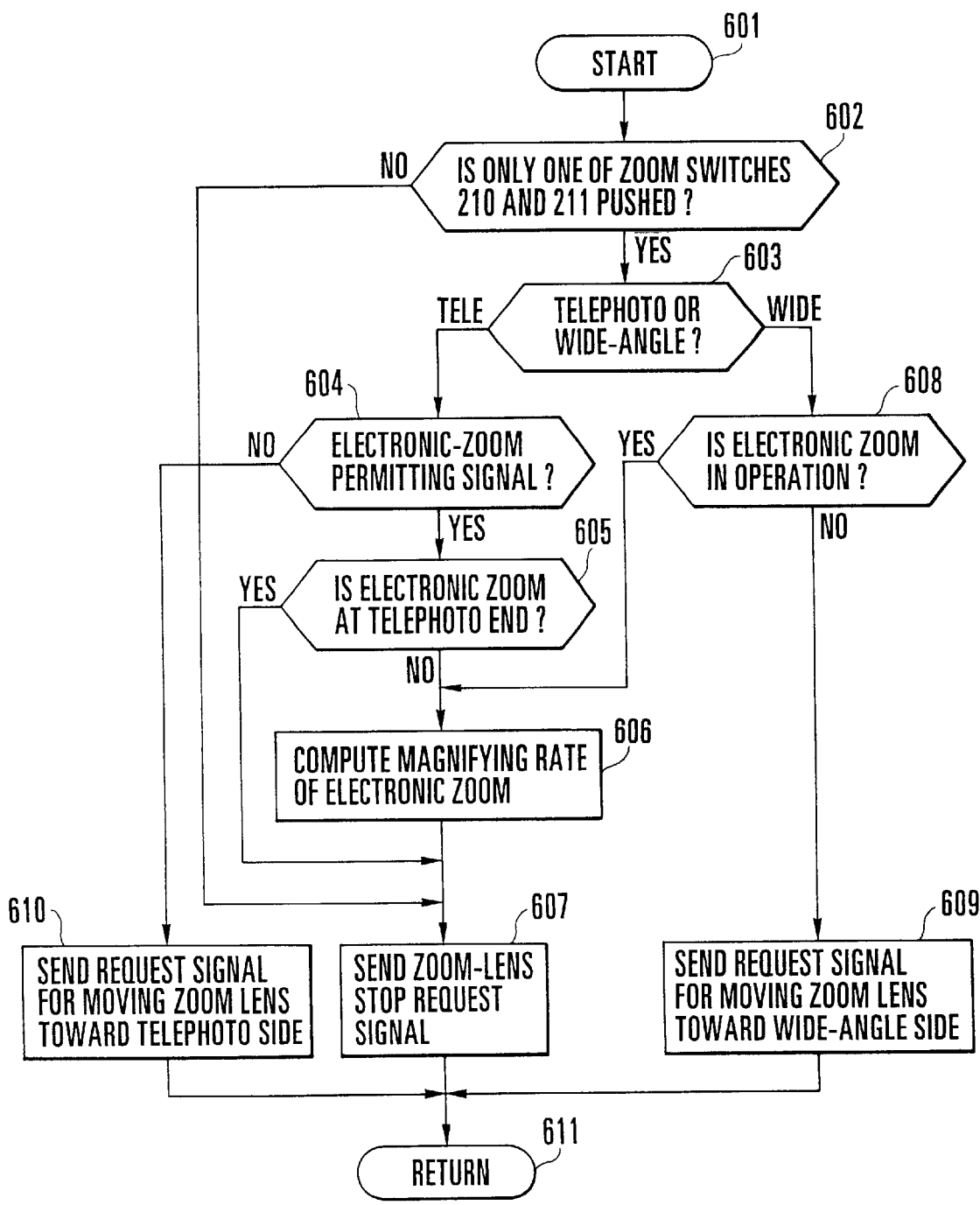
FIG. 5 is a flow chart showing processes related to the zooming operation of a camera microcomputer.

The details of the above-stated step 406 of FIG. 6 are next described with reference to FIG. 5 which is a flow chart. Referring to FIG. 5, the flow of processes begins at a step 601. At a step 602, a check is made to find if only one of the zoom switches 210 and 211 is pushed. If so, the flow comes to a step 603. If not, i.e., if both of the zoom switches 210 and 211 are found to be either pushed or not pushed, it is assumed that no zooming action is being performed, and the flow comes to a step 607. At the step 603, a check is made to find which of the zoom switches 210 and 211 is pushed. The flow comes to a step 604 if the switch 210 is alone pushed for zooming toward the telephoto side or to a step 608 if the other switch 211 is pushed for zooming toward the wide-angle side.

At the step 604, a check is made to find if an electronic-zoom permitting signal is received from the lens microcomputer 115. If so, the flow comes to a step 605. If not, the flow comes to a step 610. The electronic-zoom permitting signal is sent from the lens microcomputer 115 when the zoom lens (variator lens group 102) has already reached its telephoto end so that a further optical magnifying process is impossible. If the zoom lens has not yet reached the telephoto end, the electronic zooming process is inhibited to allow the optical zooming process to be further carried on by driving the zoom lens. At the step 605, a check is made to find if the electronic zooming process is at its telephoto end. If so, the flow comes to the step 607 without performing the electronic zooming process. If not, i.e., if the electronic zooming process has not reached its telephoto end, the flow comes to a step 606. At the step 606, the magnifying rate of the electronic zooming process is computed by increasing or decreasing the above-stated interpolation coefficients according to which of the zoom switches 210 and 211 is pushed. The magnifying process circuit 205 is controlled according to the result of that computation. After completion of the control, the flow comes to the step 607 to send a zoom-lens stop request signal to the lens microcomputer 115 for requesting to stop the zoom lens, so that the optical zooming process is brought to a stop. At the step 610, since the electronic zooming process is not allowed, a request signal is sent to the lens microcomputer 115 for requesting to move the zoom lens toward the telephoto side, without carrying out the electronic zooming process.

Meanwhile, if the zoom switch 211 for zooming toward the wide-angle side is found at the step 603 to be pushed, a check is made at the step 608 to find if the electronic zooming process is in operation. If so, the flow comes to the step 606 to carry out the computing operation for the magnifying rate of the electronic zooming process. If not, i.e., if the magnifying rate of the electronic zooming process is "1", the flow comes to a step 609. At the step 609, a request signal is sent to the lens microcomputer 115 for requesting to move the zoom lens toward the wide-angle side.

Upon completion of any of the steps 607, 610 and 609, the flow comes to a step 611 to come back to the main routine.

As is understandable from the actions described above, during the zooming action toward the telephoto side, the electronic zooming process is started after arrival of the zoom lens at its telephoto end, while, during the zooming action toward the wide-angle side, the electronic zooming is caused to reach its wide-angle end before the zoom lens is started to move toward the wideangle side. In short, the use of the electronic zooming process is made minimal.

FIG. 4 is a flow chart showing optical zooming processes to be executed with the zoom lens by the lens microcomputer 115. In the case of FIG. 4, a manual zooming operation to be performed by manually operating the zoom switches 210 and 211 disposed on the side of the camera body 200 is shown by way of example.

Referring to FIG. 4, the flow of processes begins at a step 701. At a step 702, a check is made to find if the zoom-lens stop request signal is received from the camera microcomputer 208. If so, the flow comes to a step 708 to bring the zoom lens to a stop. If not, the flow comes to a step 703. At the step 703, a check is made to find if the direction in which the zoom lens is to be moved is the telephoto direction or the wide-angle direction, from the request signal sent from the camera microcomputer 208 for indicating information on the operating states of the zoom switch 210 or 211. The flow comes to a step 704 if the moving direction of the zoom lens is the telephoto direction or to a step 705 if the moving direction of the zoom lens is the wide-angle direction.

At the step 704, a check is made to find if the zoom lens is at its telephoto end. If so, the flow comes to a step 708. If not, the flow comes to a step 706. At the step 705, a check is made to find if the zoom lens is at the wide-angle end. If so, the flow comes to the step 708. If not, the flow comes to the step 706. At the step 706, a computing operation is performed to obtain the speed of moving the zoom lens in the direction corresponding to the zoom switch 210 or 211 being pushed and the speed and direction of moving the focus lens (compensator lens group 104) for correcting the focus position which varies as the zoom lens moves. At a step 707, the zoom lens and the focusing lens are driven according to the results of the computing operation. At the step 708, the zoom lens is brought to a stop.

After execution of the step 707 or 708, the flow comes to a step 709. At the step 709, a check is made to find if the zoom lens is at its telephoto end. If so, the flow comes to a step 710. If not, the flow comes to a step 711. At the step 710, the lens microcomputer 115 sends the electronic-zoom permitting signal to the camera microcomputer 208. At the step 711, an electronic-zoom inhibiting signal is sent to the camera microcomputer 208. After execution of the step 710 or 711, the flow comes to a step 712 to come back to the main routine. In short, a zooming action is performed by the zoom lens and the electronic zooming process is inhibited until the zoom lens reaches its telephoto end. The electronic zooming process is permitted after the zoom lens reaches its telephoto end.

Figure 8:
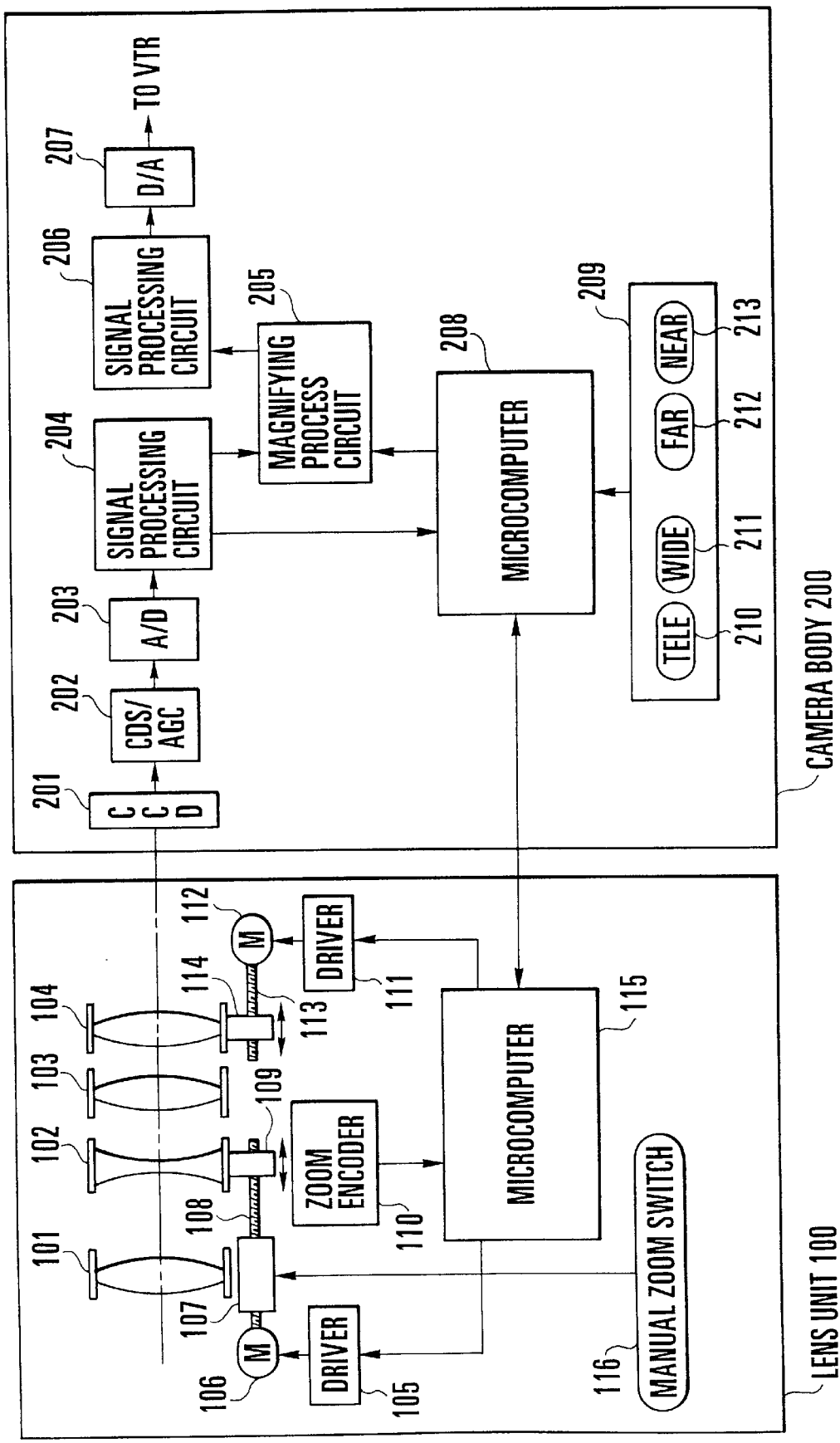
FIG. 8 is a block diagram showing the arrangement of an interchangeable lens type video camera system according to a second embodiment of this invention.

FIG. 8 shows in a block diagram the arrangement of an interchangeable lens type video camera system according to a second embodiment of this invention. In FIG. 8, all the parts that are substantially the same as those of FIG. 1 are indicated by the same reference numerals, and the details of them are omitted from the following description.

The interchangeable lens type video camera system according to the second embodiment is further provided with a manual zoom switch 116 which is disposed on the side of the lens unit 100. The manual zoom switch 116 is connected to the gear 107, and the gear 107 is provided with a known slip mechanism. According to such an arrangement, an optical zooming action is mechanically performed by manually operating the manual zoom switch 116, in preference to the zooming action by the motor 106 based on the operating states of the zoom switches 210 and 211. In this case, at the above-stated step 405 of FIG. 6, the lens microcomputer 115 sends to the camera microcomputer 208 the electronic-zoom permitting/inhibiting signal and information as to whether or not the zoom lens is at its telephoto end.

Figure 9:
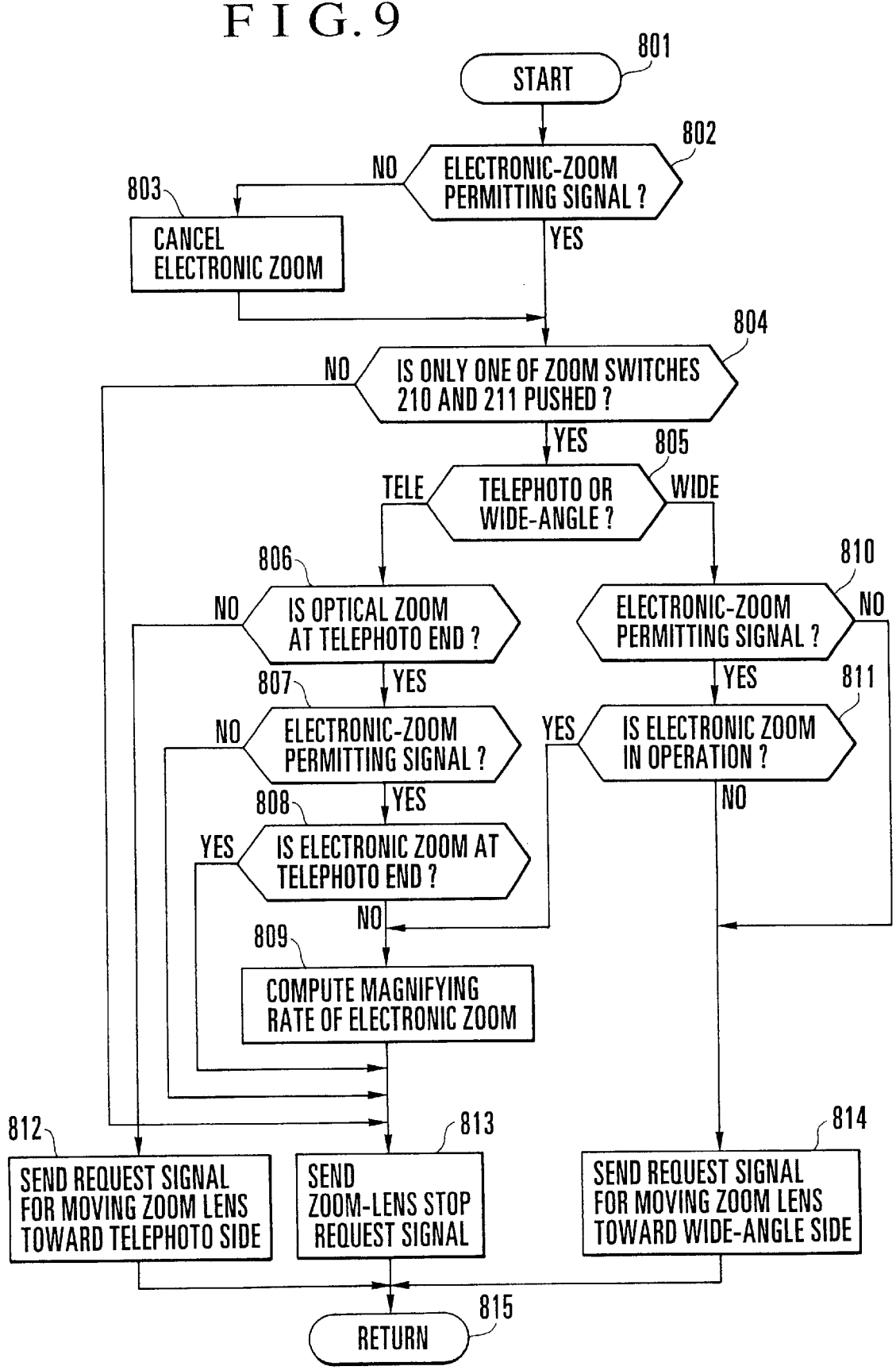
FIG. 9 is a flow chart showing processes related to a zooming operation of a camera microcomputer in the second embodiment.

In the case of the second embodiment, the step 406 of FIG. 6 is executed in a manner as shown in detail in FIG. 9. The processes shown in FIG. 9 are executed on the side of the camera body 200.

Referring to FIG. 9, the flow of processes begins at a step 801. At a step 802, a check is made to find if the electronic-zoom permitting signal is received from the lens microcomputer 115. If so, i.e., if the zoom lens is adjacent to its telephoto end, the flow comes to a step 804. If not, i.e., if the zoom lens is not adjacent to its telephoto end, the flow comes to a step 803. At the step 803, the electronic zooming process is cancelled, and the flow comes to the step 804. At the step 804, a check is made to find if only one of the zoom switches 210 and 211 is pushed. If both of the zoom switches 210 and 211 are either pushed or not pushed, the flow comes to a step 813. If one of the zoom switches 210 and 211 is pushed, the flow comes to a step 805.

At the step 805, a check is made to find which of the zoom switches 210 and 211 is pushed. The flow comes to a step 806 if the zoom switch 210 for zooming toward the telephoto side is pushed. The flow comes to a step 810 if the zoom switch 211 for zooming toward the wide-angle side is pushed. At the step 806, a check is made to find if a telephoto end signal indicating that the zoom lens is at its telephoto end is received from the lens microcomputer 115. If so, the flow comes to a step 807. If not, the flow comes to a step 812. At the step 807, a check is made to find if the electronic-zoom permitting signal is received from the lens microcomputer 115. If so, the flow comes to a step 808. If not, the flow comes to the step 813.

At the step 808, a check is made to find if the electronic zooming process is at its telephoto end. If so, the flow comes to the step 813. If not, the flow comes to a step 809. At the step 809, the magnifying rate of the electronic zooming process is computed by increasing or decreasing the interpolation coefficients according to which of the zoom switches 210 and 211 is pushed. The magnifying process circuit 205 is controlled according to the result of the computing operation. The flow then comes to the step 813.

At the step 810, a check is made to find if the electronic-zoom permitting signal is received from the lens microcomputer 115. If so, the flow comes to a step 811. If not, the flow comes to a step 814. At the step 811, a check is made to find if the electronic zooming process is in operation. If so, the flow comes to the step 809. If not, the flow comes to the step 814. At the step 814, a request signal is sent to the lens microcomputer 115 for requesting to move the zoom lens to the wide-angle side.

At the step 812, a request signal is sent to the lens microcomputer 115 for requesting to move the zoom lens to the telephoto side. Further, at the step 813, a zoom-lens stop request signal is sent to the lens microcomputer 115 for requesting to stop the zoom lens.

Figure 10:
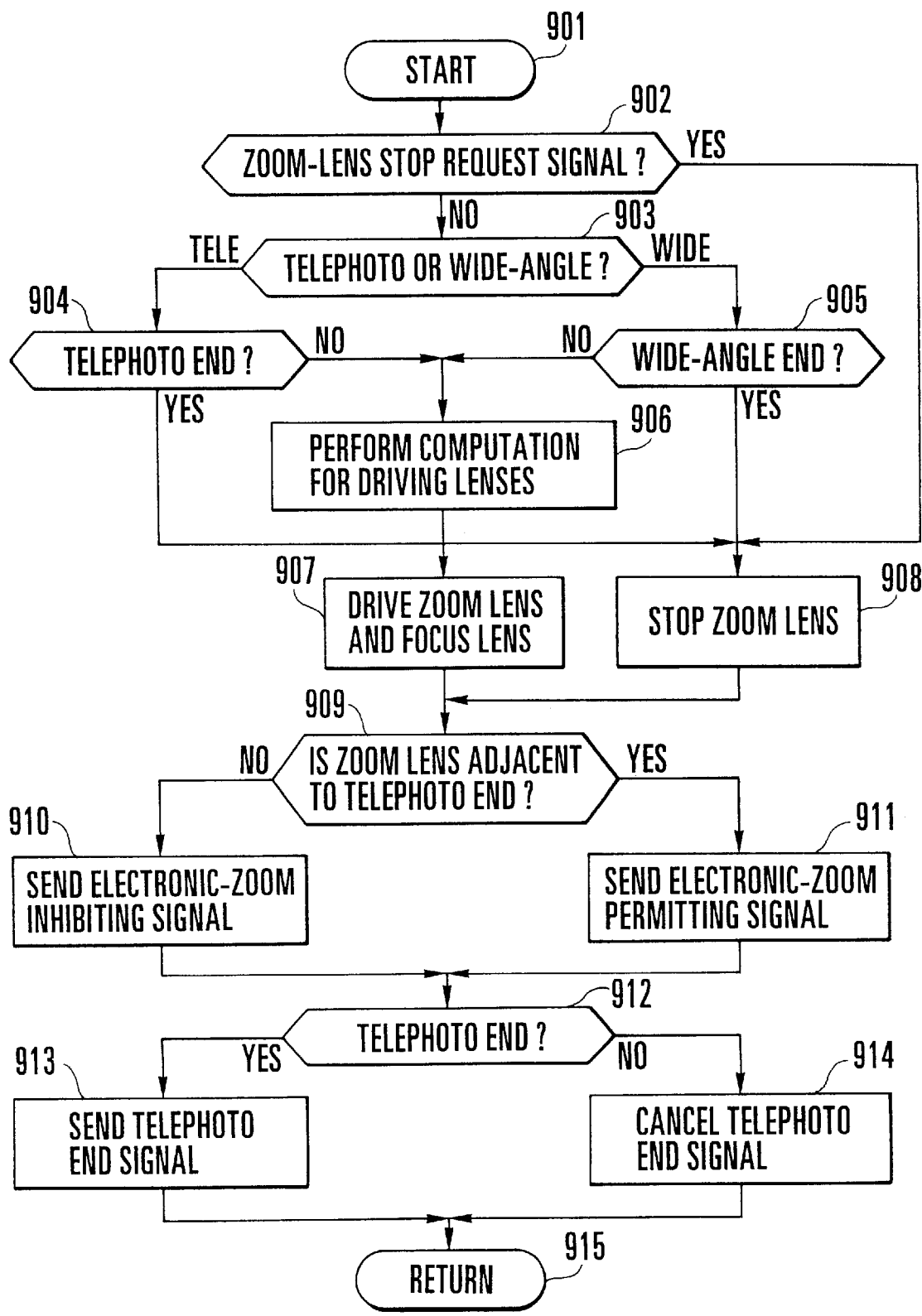
FIG. 10 is a flow chart showing processes related to the zooming operation of a lens microcomputer in the second embodiment.

FIG. 10 is a flow chart showing a flow of zooming processes to be executed by the lens microcomputer 115. The flow chart shown in FIG. 10 is based on the assumption that a manual zooming operation is performed by driving the zoom lens with the zoom switches 210 and 211.

Referring to FIG. 10, the flow of processes begins at a step 901. At a step 902, a check is made to find if the zoom-lens stop request signal is received from the camera microcomputer 208. If not, the flow comes to a step 903. If so, the flow comes to a step 908. At the step 903, a check is made to find if the direction in which the zoom lens is to be moved is the telephoto direction or the wide-angle direction, from the request signal sent from the camera microcomputer 208 for indicating information on the operating states of the zoom switch 210 or 211. If the moving direction of the zoom lens is the telephoto direction, the flow comes to a step 904. If the moving direction of the zoom lens is the wide-angle direction, the flow comes to a step 905.

At the step 904, a check is made to find if the zoom lens is at its telephoto end. If so, the flow comes to the step 908. If not, the flow comes to a step 906. At the step 905, a check is made to find if the zoom lens is at its wide-angle end. If so, the flow comes to the step 908. If not, the flow comes to the step 906. At the step 906, a computing operation is performed to obtain the moving speed of the zoom lens and the moving speed and direction in which the focusing lens is to be moved. At a step 907, the focusing lens and the zoom lens are caused to move according to the result of the computing operation. The flow then comes to a step 909. At the step 908, the zoom lens is brought to a stop. After that, the flow comes to the step 909.

At the step 909, a check is made if a position detecting signal indicating that the zoom lens is adjacent to its telephoto end has come from the zoom encoder 110. If so, the flow comes to a step 911 to send the electronic-zoom permitting signal to the camera microcomputer 208. If not, the flow comes to a step 910 to send the electronic-zoom inhibiting signal to the camera microcomputer 208. Then, an area adjacent to the telephoto end is set as an electronic-zoom permitting area, while the other area is set as an electronic-zoom inhibiting area. After the step 910 or 911, the flow comes to a step 912. The processes of the steps 909 and 910 effectively prevent the electronic zooming process from being cancelled due to an inadvertent operation on the manual zoom switch 116 when the operator happens to unintentionally touch the switch 116 while the electronic zooming process is still in operation. In other words, according to the second embodiment, the electronic zooming process is permitted even when the zoom lens is not exactly at the telephoto end but is in the area adjacent to the telephoto end, and, even if the manual zoom switch 116 happens to be unintentionally touched to move the zoom lens a little away from the telephoto end while the electronic zooming process is in operation after arrival of the zoom lens at the telephoto end, the electronic zooming process is never cancelled.

At the step 912, a check is made to find if the zoom lens is at its telephoto end. If so, the flow comes to a step 913 to send the telephoto end signal to the camera microcomputer 208 before the flow comes to a step 915. If not, the flow comes to a step 914 to cancel the telephoto end signal. The flow then comes to the step 915 to come back to the main routine.

As described above, as information about permission/inhibition of the electronic zooming process is transmitted from the interchangeable lens unit to the camera body, a smooth change-over from the optical zooming process to the electronic zooming process or vice a can be attained without causing an in-focus state being impaired.

What is claimed is:

1. An interchangeable lens type camera system comprising:
    a) a camera body;
    b) a lens unit detachably mounted on said camera body;
    c) optical magnification varying means disposed within said lens unit;
    d) electronic magnification varying means disposed within said camera body and arranged to electronically magnify an image;
    e) communication means for communicating control information between said camera body and said lens unit;
    f) lens-side control means disposed in said lens unit and transmitting to said camera body the control information including a status information of said optical magnification varying means through said communication means, the control information used for controlling an operation of said electronic magnification varying means on the basis of an operating state of said optical magnification varying means; and
    g) camera-side control means disposed in said camera body and arranged to enable said electronic magnification varying means on the basis of said control information received from said lens-side control means through said communication means and to transmit control information to said lens side control means so as to disable said optical magnification varying means during enablement of said electronic magnification varying means.

2. An interchangeable lens type camera system according to claim 1, wherein said information is information indicating whether or not said optical magnification varying means is located at a telephoto end or is located adjacent to the telephoto end.

3. An interchangeable lens type camera system according to claim 2, wherein said camera-side control means inhibits the action of said electronic magnification varying means when having received information indicating that said optical magnification varying means is not located at the telephoto end or is not located adjacent to the telephoto end.

4. A lens unit adapted to be detachably mounted on a camera body having electronic magnification varying means for electronically magnifying an image, comprising:
    a) optical magnification varying means;
    b) communication means for communicating control information between said camera body and said lens unit; and c) control means arranged to transmit to said camera body the control information including a status information of said optical magnification varying means through said communication means, the control information used for controlling an operation of said electronic magnification varying means according to an operating state of said optical magnification varying means and to disable said optical magnification varying means upon the control information of said electronic magnification varying means transmitted from said camera.

5. A lens unit according to claim 4, wherein said information is information indicating whether or not said optical magnification varying means is located at a telephoto end or is located adjacent to the telephoto end.

6. A lens unit according to claim 5, wherein said optical magnification varying means includes optical zoom means.

7. An interchangeable lens type camera adapted to detachably mount a lens unit thereon, comprising:
 a) means for receiving, from said lens unit through communication means arranged between said camera and said lens unit, control information about an operating state of optical magnification varying means disposed within said lens unit;
 b) image pickup means for photo-electrically converting an optical image formed through said lens unit into a picked-up image signal and for outputting the picked-up image signal;
 c) electronic magnification varying means for electronically magnifying the picked up image signal; and
 d) control means for controlling an operation of said electronic magnification varying means on the basis of said information about the operating state of said optical magnification varying means and outputting to said lens unit through said communication means control information for disabling said optical magnification varying means on the basis of an operation of said electronic magnification varying means.

8. An interchangeable lens type camera according to claim 7, wherein said information is information indicating whether or not said optical magnification varying means is located at a telephoto end or is located adjacent to the telephoto end.

9. An interchangeable lens type camera according to claim 8, wherein said control means inhibits the action of said electronic magnification varying means when having received information indicating that said optical magnification varying means is not located at the telephoto end or is not located adjacent to the telephoto end.

10. An image capturing system comprising;
 a) first optical magnification varying means disposed in a first device;
 b) second electronic magnification varying means disposed in a second device detachably to said first device;
 c) a first control circuit disposed in said first device for controlling said first magnification varying means;
 d) a second control circuit disposed in said second device for controlling said second magnification varying means; and
 e) communication means for mutually communicating information between said first control circuit and said second control circuit, wherein said first control circuit transmits, to said second control circuit through said communication means, predetermined information including status information of said first magnification varying means used for controlling an action of aid second magnification varying means on the basis of an operating state of said first magnification varying means, and said second control circuit controls said second control magnification varying means on the basis of said predetermined information received from said first control circuit through said communication means,
 said second control circuit transmitting, to said first control circuit through said communication means, information for enabling or disabling control of said first magnification varying means.

11. An image capturing system in according to claim 10, wherein the predetermined information indicates whether or not said first optical magnification varying means is located at a telephoto end or is located adjacent to the telephoto end.

12. An image capturing system according to claim 11, wherein said second control circuit inhibits the action of said second electronic magnification varying means in the case that the predetermined information indicates that said optical magnification varying means is not located at the telephoto end or is not located adjacent the telephoto end.

13. An image capturing system according to claim 12, wherein the information indicates whether or not said second electronic magnification varying means is operating.

14. An image capturing system according to claim 13, wherein said first control circuit inhibits an operation of said first optical magnification varying means in the case that the information indicates that the second electronic magnification varying means is operating.

15. An image processing system comprising:
 a) first zooming means for optically zooming an image;
 b) second zooming means, detachably to said first zooming means, for electronically zooming the image;
 c) a first microcomputer for controlling said first zooming means;
 d) a second microcomputer for controlling said second zooming means; and
 e) communication means for mutually communicating information between said first microcomputer and said second microcomputer,
  wherein said first microcomputer transmits, to said second microcomputer through said communication means, predetermined information including status of said first zooming means relative to an operating state of said first zooming means used for controlling an operation of said second zooming means, and said second microcomputer controls said second zooming means on the basis of said predetermined information received from said first microcomputer through said communication means;
  said second microcomputer transmitting, to said first microcomputer, information for disabling said first zooming means upon an operation of said second zooming means.

16. An image processing system according to claim 15, wherein the predetermined information indicates whether or not said first zooming means is located at a telephoto end or is located adjacent to the telephoto end.

17. An image processing apparatus according to claim 16, wherein said second microcomputer inhibits the action of said second zooming means in the case that the predetermined information indicates that said fist zooming means is not located at the telephoto end or is not located adjacent the telephoto end.

18. An image processing system according to claim 17, wherein the information indicates whether or not said second zooming means is operating.

19. An image processing system according to claim 18, wherein said first microcomputer inhibits an operation of said first zooming means in the case that the information indicates that said second zooming means is operating.

* * * * *

UNITED STATES PATENT AND TRADEMARK OFFICE
CERTIFICATE OF CORRECTION

PATENT NO. : 6,348,948 B1
DATED : February 19, 2002
INVENTOR(S) : Kenji Kyuma

It is certified that error appears in the above-identified patent and that said Letters Patent is hereby corrected as shown below:

Title page,
Item [54], delete "INTERCHANGEABLE LENS TYPE CAMERA SYSTEM" and insert -- IMAGE PROCESSING SYSTEM HAVING OPTICAL AND ELECTRONIC IMAGE MAGNIFIERS --.

Column 7,
Line 33, delete "wideangle" and insert -- wide-angle --.

Column 11,
Line 64, delete "of aid" and insert -- of said --.

Signed and Sealed this

Twelfth Day of November, 2002

Attest:

Attesting Officer

JAMES E. ROGAN
*Director of the United States Patent and Trademark Office*